United States Patent
Xiang et al.

(10) Patent No.: US 11,537,297 B1
(45) Date of Patent: Dec. 27, 2022

(54) DELETING SNAPSHOT PAGES USING SEQUENCE NUMBERS AND PAGE LOOKUPS

(71) Applicant: VMware, Inc., Palo Alto, CA (US)

(72) Inventors: Enning Xiang, Palo Alto, CA (US); Wenguang Wang, Santa Clara, CA (US); Pranay Singh, Palo Alto, CA (US); Subhradyuti Sarkar, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/479,594

(22) Filed: Sep. 20, 2021

(51) Int. Cl.
  *G06F 3/06* (2006.01)
(52) U.S. Cl.
  CPC .......... *G06F 3/0619* (2013.01); *G06F 3/0604* (2013.01); *G06F 3/0652* (2013.01); *G06F 3/0659* (2013.01); *G06F 3/0665* (2013.01); *G06F 3/0673* (2013.01)
(58) Field of Classification Search
  CPC .... G06F 3/0619; G06F 3/0604; G06F 3/0652; G06F 3/0659; G06F 3/0665; G06F 3/0673
  See application file for complete search history.

(56) References Cited

U.S. PATENT DOCUMENTS

| | | | |
|---|---|---|---|
| 7,043,503 B2 | 5/2006 | Haskin et al. | |
| 7,882,067 B2 | 2/2011 | Saika | |
| 7,953,704 B2 | 5/2011 | Anderson et al. | |
| 8,010,493 B2 | 8/2011 | Anderson et al. | |
| 8,015,156 B2 | 9/2011 | Anderson et al. | |
| 8,200,632 B2 | 6/2012 | Schack et al. | |
| 2022/0083504 A1* | 3/2022 | Carey | G06F 16/128 |

* cited by examiner

Primary Examiner — Eric Cardwell (57) ABSTRACT

The present disclosure is related to methods, systems, and machine-readable media for deleting snapshot pages using sequence numbers and page lookups. A monotonically-increasing sequence number (SN) can be assigned to each created page of a first snapshot of a storage volume. A first snapshot sequence number (snapSN) can be assigned to the first snapshot responsive to a creation of a second snapshot, wherein the first snapSN is equal to a largest SN of the first snapshot. An SN can be assigned to each created page of the second snapshot, wherein a first page of the second snapshot is assigned an SN monotonically increased from the first snapSN. A second snapSN can be assigned to the second snapshot responsive to a creation of a third snapshot, wherein the second snapSN is equal to a largest SN of the second snapshot. An SN can be assigned to each created page of the third snapshot, wherein a first page of the third snapshot is assigned an SN monotonically increased from the second snapSN. A deletion process can be performed in response to receiving a request to delete the second snapshot that includes deleting a particular page of the second snapshot responsive to determining that the particular page is not shared between the second snapshot and the first snapshot or between the second snapshot and the third snapshot.

20 Claims, 5 Drawing Sheets

DELETING SNAPSHOT PAGES USING SEQUENCE NUMBERS AND PAGE LOOKUPS

BACKGROUND

A data center is a facility that houses servers, data storage devices, and/or other associated components such as backup power supplies, redundant data communications connections, environmental controls such as air conditioning and/or fire suppression, and/or various security systems. A data center may be maintained by an information technology (IT) service provider. An enterprise may purchase data storage and/or data processing services from the provider in order to run applications that handle the enterprises' core business and operational data. The applications may be proprietary and used exclusively by the enterprise or made available through a network for anyone to access and use.

Virtual computing instances (VCIs) have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. In a software defined data center, storage resources may be allocated to VCIs in various ways, such as through network attached storage (NAS), a storage area network (SAN) such as fiber channel and/or Internet small computer system interface (iSCSI), a virtual SAN, and/or raw device mappings, among others.

Snapshots may be utilized in a software defined data center to provide backups and/or disaster recovery. For instance, a snapshot can be used to revert to a previous version or state of a VCI. Snapshots may utilize a copy-on-write policy that involves sharing storage, which, while being space efficient, makes deletion problematic. Deleting snapshots may include determining the pages of a file system that are "owned" by a snapshot and the extents of the file system that are shared between snapshots. Some previous approaches to deleting snapshots keep reference counts of nodes and later check these reference counts to determine whether a node is shared or capable of being deleted. These approaches introduce an amount of IO overhead sufficient to cause noticeable slowdowns.

DETAILED DESCRIPTION

The term "virtual computing instance" (VCI) refers generally to an isolated user space instance, which can be executed within a virtualized environment. Other technologies aside from hardware virtualization can provide isolated user space instances, also referred to as data compute nodes. Data compute nodes may include non-virtualized physical hosts, VCIs, containers that run on top of a host operating system without a hypervisor or separate operating system, and/or hypervisor kernel network interface modules, among others. Hypervisor kernel network interface modules are non-VCI data compute nodes that include a network stack with a hypervisor kernel network interface and receive/transmit threads.

VCIs, in some embodiments, operate with their own guest operating systems on a host using resources of the host virtualized by virtualization software (e.g., a hypervisor, virtual machine monitor, etc.). The tenant (i.e., the owner of the VCI) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VCI segregation that may be offered in hypervisor-virtualized environments that virtualize system hardware, and thus can be viewed as a form of virtualization that isolates different groups of applications that operate in different containers. Such containers may be more lightweight than VCIs.

While the specification refers generally to VCIs, the examples given could be any type of data compute node, including physical hosts, VCIs, non-VCI containers, and hypervisor kernel network interface modules. Embodiments of the present disclosure can include combinations of different types of data compute nodes.

As used herein with respect to VCIs, a "disk" is a representation of memory resources (e.g., memory resources 110 illustrated in FIG. 1) that are used by a VCI. As used herein, "memory resource" includes primary storage (e.g., cache memory, registers, and/or main memory such as random access memory (RAM)) and secondary or other storage (e.g., mass storage such as hard drives, solid state drives, removable media, etc., which may include non-volatile memory). The term "disk" does not imply a single physical memory device. Rather, "disk" implies a portion of memory resources that are being used by a VCI, regardless of how many physical devices provide the memory resources.

A storage volume snapshot (referred to herein simply as "snapshot") is a copy of a disk file at a given point in time. In some embodiments, a snapshot is a copy of a disk file of a VCI at a given point in time. A snapshot can preserve the state of a storage volume so that it can be reverted to at a later point in time. A snapshot can store changes from a parent snapshot (e.g., without storing an entire copy of the parent snapshot). Snapshots provide filesystems the ability to take an instantaneous copy of the filesystem. An instantaneous copy allows the restoration of older versions of a file or directory from an accidental deletion, for instance. Snapshots also provide the foundation for other disaster recovery features, such as backup applications and/or snapshot-based replication.

A filesystem may provide the ability to take a snapshot of a storage volume (e.g., file share) by using a tree data structure (e.g., a CoW B+tree), which is sometimes referred to herein simply as a "tree." A snapshot can be considered a copy of a file-share (sub-volume) as it preserves data and metadata for the entire file-share, so one can create a point in time read-only image of the file system. Many sub-volumes can be created in a single volume. Each snapshot of a sub-volume shares data blocks and metadata with other snapshots of the same sub-volume. The sharing of data and metadata makes snapshots space efficient. Units of data that are shared between two or more snapshots can be said to be "common" to those two or more snapshots.

A tree corresponding to a snapshot includes one or more nodes. A node, as referred to herein, is a unit of data storage. In some cases, a node may be a page of data. The present disclosure uses the term "node" and "page" interchangeably, though it is noted that nodes in accordance with the present disclosure may be of different sizes (e.g., 4 kilobytes, 8 kilobytes, etc.). In some embodiments, a node spans across multiple pages in size. As previously discussed, snapshots may utilize a copy-on-write policy that involves sharing storage, which, while being space efficient, makes deletion of nodes problematic. Deleting a snapshot includes deleting B+tree pages exclusively owned by the snapshot to be deleted.

As discussed further below, in some cases a single snapshot can "own" a page. In other cases, more than one snapshot can "share" a page. Stated differently, more than one snapshot can own a page. Where a snapshot "owning" a page is discussed herein, it is to be understood that such ownership refers to exclusive ownership and not shared ownership. Where a snapshot sharing a page is discussed herein, it is to be understood that such shared ownership does not refer to exclusive ownership. A page of a snapshot can include one or more extents. An extent is a contiguous area of storage reserved for a file in a file system. An extent can be represented, for instance, as a range of block numbers. Stated differently, an extent can include one or more data blocks that store data.

Deleting snapshots includes determining and/or keeping track of the pages of a file system that are owned by a snapshot and the pages of the file system that are shared between snapshots. Generally, deleting a snapshot includes deleting any pages that are owned by the snapshot to be deleted and retaining any pages that are shared by that snapshot.

Some approaches to snapshot deletion (referred to herein as "reference counting methods") include adding a reference count for each page. In these approaches, the reference count of the page is incremented when a new page is copied out on write, and the reference count is decremented when a relevant snapshot is deleted. However, these approaches suffer from performance issues. When deleting a snapshot, for instance, the system has to scan the metadata (CoW (copy on write) B+tree) of all pages accessible to the snapshot. Such scans may encompass a large number of pages. The IO cost of these scans can be very high.

Other approaches to snapshot deletion (referred to herein as "iterator methods") utilize three iterators, one to scan a snapshot that is to be deleted, a second to scan its parent snapshot, and a third to scan its child snapshot. While these iterators can determine the pages that are not shared and delete them, their primary drawback is the additional IO overhead to scan the parent snapshot and the child snapshot.

Embodiments of the present disclosure can delete snapshots without using the reference counts of reference counting methods and without the quantity of iterators of iterator methods. In some embodiments, for instance, the parent iterator can be eliminated entirely while a child iterator may be utilized. In other embodiments, the child iterator can also be eliminated, and its functionality replaced with a lookup where the exclusively owned pages in the child snapshot need not be iterated one by one. As a result, embodiments herein provide markedly improved IO performance than both reference counting methods and iterator methods.

In accordance with the present disclosure, and as discussed further below, each snapshot can have its own logical map B+tree. Each page can be assigned a monotonically-increasing sequence number (SN) (e.g., when the page is created). For each snapshot, embodiments herein can maintain a per-snapshot SN (referred to herein as a "snapSN"). The snapSN of a given snapshot can be assigned to it when its first child snapshot is created.

As described further below, the snapSN reflects the latest (e.g., current) number of the monotonically-increasing SN. Stated differently, in some embodiments, the snapSN is equal to a largest SN of any pages in that snapshot. In an example, if two pages of a first snapshot are written (and assigned SNs of 1 and 2, respectively) and then a second (child) snapshot is created, the creation of the second snapshot results in the first (parent) snapshot being assigned a snapSN of 2. A page then written to the second snapshot is assigned an SN of 3 and subsequent pages written to the second snapshot are respectively assigned SNs increasing monotonically (e.g., 4, 5, 6, etc.). As will be appreciated, the snapSN of a given snapshot is equal to or larger than the SN of the last page (e.g., the newest or most recent page) in the snapshot, but smaller than any page (including the root node page) of any of its child snapshots. As described further below, relying on the relation between the SN of a page of a snapshot to be deleted and the snapSN of its parent snapshot, embodiments of the present disclosure can readily determine whether the page is shared with its parent snapshot. If so, the page will not be deleted. Additionally, embodiments herein can utilize a page lookup (discussed further below) to determine whether the page is shared with its child snapshot. If so, the page will not be deleted. Generally, if a page of a snapshot to be deleted is shared with either its parent snapshot or its child snapshot, embodiments herein will retain (e.g., not delete) the page, and if a page of a snapshot to be deleted is not shared with either its parent snapshot or its child snapshot, embodiments herein will delete the page.

The figures herein follow a numbering convention in which the first digit or digits correspond to the drawing figure number and the remaining digits identify an element or component in the drawing. Similar elements or components between different figures may be identified by the use of similar digits. For example, 114 may reference element "14" in FIG. 1, and a similar element may be referenced as 614 in FIG. 6. As will be appreciated, elements shown in the various embodiments herein can be added, exchanged, and/ or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Figure 1:
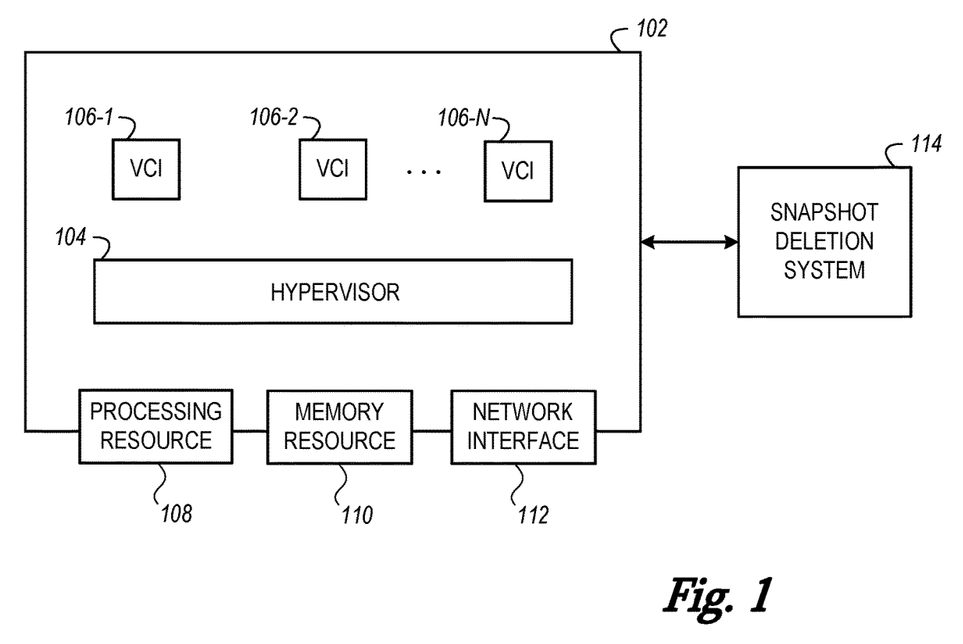
FIG. 1 is a diagram of a host and a system for deleting snapshot pages using sequence numbers and page lookups according to one or more embodiments of the present disclosure.

FIG. 1 is a diagram of a host and a system for file system event monitoring using metadata snapshots according to one or more embodiments of the present disclosure. The system can include a host 102 with processing resources 108 (e.g., a number of processors), memory resources 110, and/or a network interface 112. The host 102 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 102 can incorporate a hypervisor 104 that can execute a number of virtual computing instances 106-1, 106-2, . . . , 106-N (referred to generally herein as "VCIs 106"). The VCIs can be provisioned with processing resources 108 and/or memory resources 110 and can communicate via the network interface 112. The processing resources 108 and the memory resources 110 provisioned to the VCIs can be local and/or remote to the host 102. For example, in a software defined data center, the VCIs 106 can be provisioned with resources that are generally available to the software defined data center and not tied to any particular hardware device. By way of example, the memory resources 110 can include volatile and/or non-volatile memory available to the VCIs 106. The VCIs 106 can be moved to different hosts (not specifically illustrated), such that a different hypervisor manages the VCIs 106. The host 102 can be in communication with a snapshot deletion system 114. An example of the snapshot deletion system 114 is illustrated and described in more detail below. In some embodiments, the snapshot deletion system 114 can be a server, such as a web server.

Figure 2A:
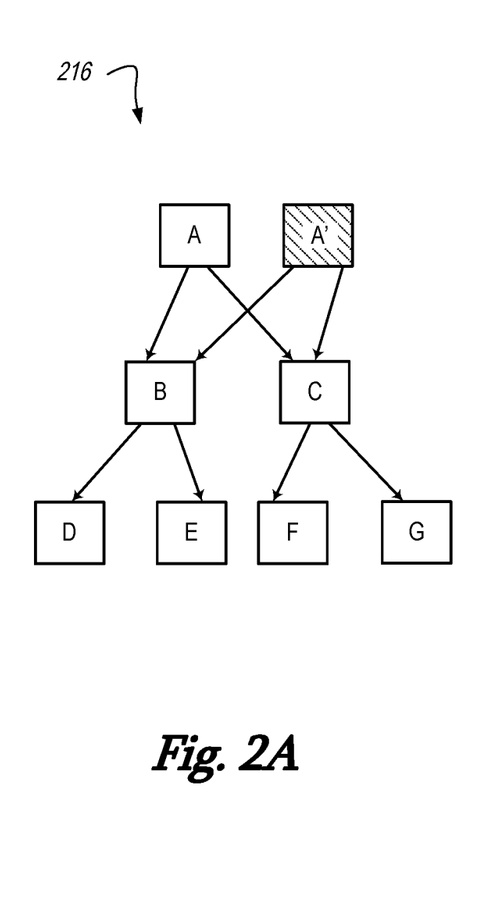
FIG. 2A illustrates an example file system B–tree according to one or more embodiments of the present disclosure at a first time instance.
Figure 2B:
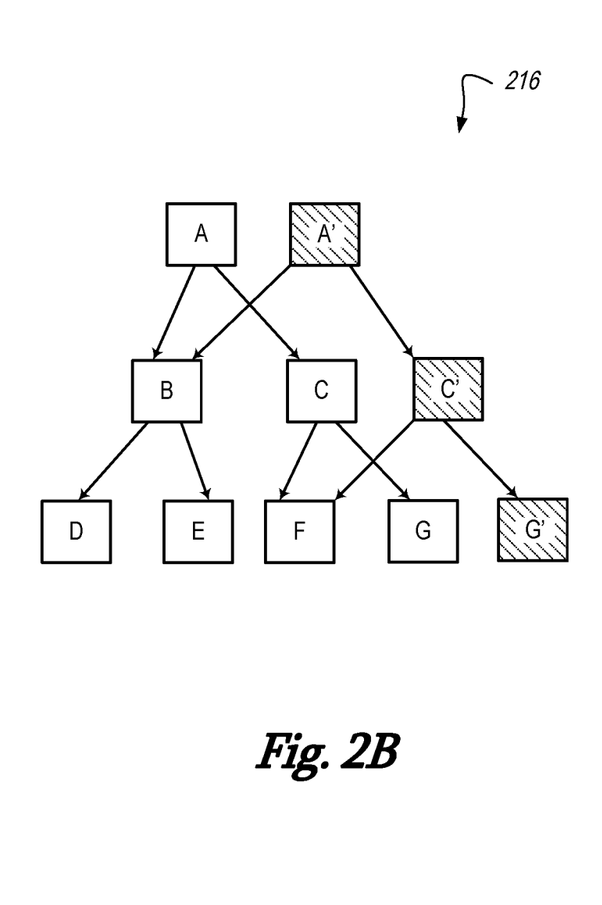
FIG. 2B illustrates the example file system B–tree at a second time instance.

FIG. 2A illustrates an example file system B-tree 216 according to one or more embodiments of the present disclosure at a first time instance. FIG. 2B illustrates the example file system B-tree 216 at a second time instance. FIGS. 2A and 2B may be cumulatively referred to herein as "FIG. 2." As shown in FIG. 2, the B-tree 216 includes an old root node A and new root node A'. The latest version of the file system (e.g., new writes) would point to root node A', whereas the older root node A would be pointed to by snapshot. A live sub-volume represents the share of the file system where files are created and deleted (e.g., the disk backing which a VCI is currently writing to). As new writes happen to the live sub-volume, the two B-trees start to differ. Thus, as shown in FIG. 2B, nodes C' and G' have been added as child nodes of root node A'. The live sub-volume may be alternatively referred to herein as a "running point."

Snapshots can be used to support backup, replication, and local data protection, which involves storing older versions of the data in snapshots. As previously discussed, snapshots can be taken periodically, but do not allow old (e.g., shared) data to be deleted.

Figure 3:
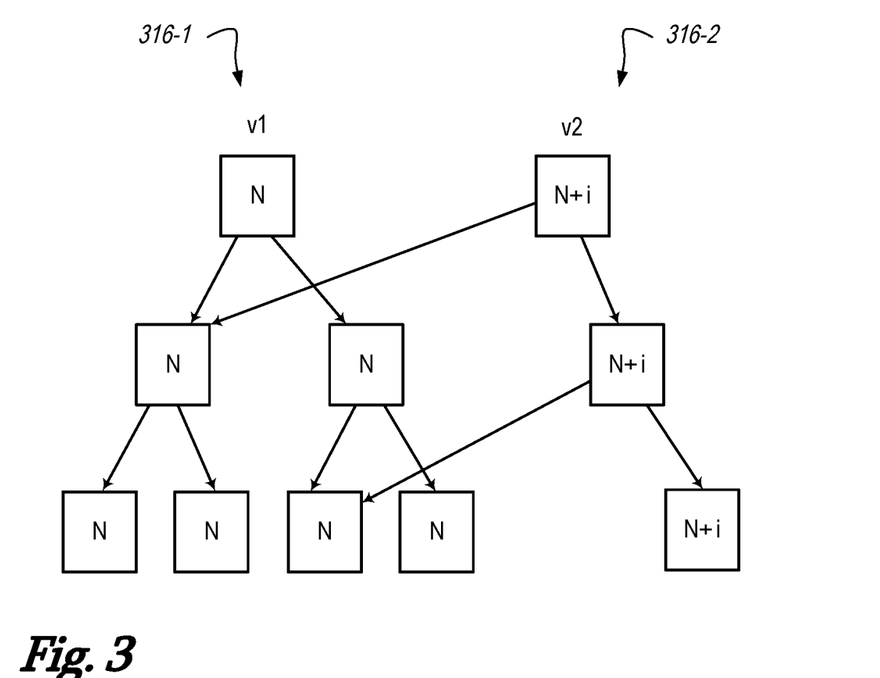
FIG. 3 illustrates two example file system B–trees, each belonging to a snapshot of a given sub-volume according to one or more embodiments of the present disclosure.

FIG. 3 illustrates two example file system B-trees, each belonging to a snapshot of a given sub-volume according to one or more embodiments of the present disclosure. The file system B-trees illustrated in FIG. 3 are a first tree 316-1 and a second tree 316-2. The first tree 316-1 may be alternatively referred to as "snapshot 1" and the second tree 316-2 may be alternatively referred to as "snapshot 2." In FIG. 3, squares represent the page/node of the B-tree and the label on each page is a pagestamp (e.g., a monotonically increasing pagestamp) associated with that page. B-tree implementation enforces the fact that pagestamps of internal and leaf nodes cannot be greater than the root of the B-tree.

As previously discussed, some previous approaches use lazy reference counting of file system B-tree and embedded reference counting to track the ownership of extents. The embedded reference count is a shared bit per extent (variable size data block) that tracks the ownership of an extent together with the page stamping of the node. Thus, the same extent may be considered shared (e.g., owned by more than one snapshot) when read by one snapshot and owned (e.g., owned by a single snapshot) when read by a different snapshot.

As may be known to those of skill in the art, deleting a snapshot can be considered a two-step process. The first step can be termed as "hollowing out," wherein any extents that are owned by the snapshot are deleted. The second step can involve deleting non-shared nodes of the B-tree.

Figure 4:
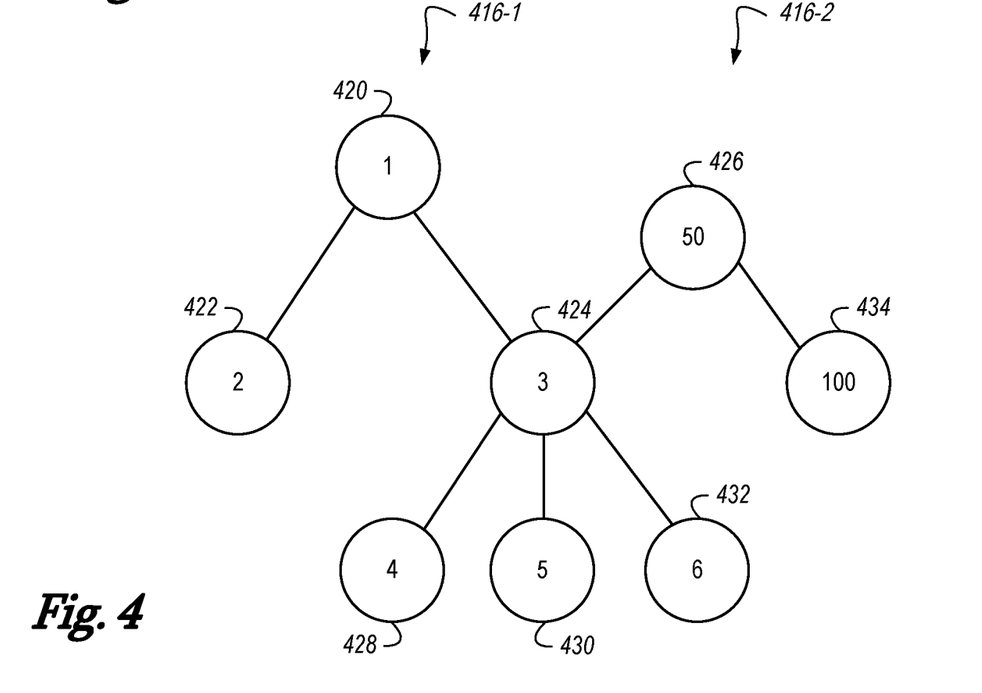
FIG. 4 illustrates two other example file system B+trees, each belonging to a snapshot of a given sub-volume according to one or more embodiments of the present disclosure.

FIG. 4 illustrates two other example file system B+trees, each belonging to a snapshot of a given sub-volume according to one or more embodiments of the present disclosure. It is noted that reference back to FIG. 4 may be made herein.

The file system B+trees illustrated in FIG. 4 are a first tree 416-1 and a second tree 416-2. The first tree 416-1 may be alternatively referred to as "snapshot 1" or the "parent snapshot" and the second tree 416-2 may be alternatively referred to as "snapshot 2" or the "child snapshot." In FIG. 4, circles represent the page/node of the B+tree and the label on each page is the SN (e.g., a monotonically increasing SN) assigned to that page. For purposes of clarity, some nodes of the trees 416 are not shown in FIG. 4.

As shown in FIG. 4, snapshot 1 416-1 includes a root node 420 assigned an SN of 1, a child node 422 assigned an SN of 2, and a child node assigned an SN of 3. Node 424 is in internal (e.g., index) node and has a child node 428 assigned an SN of 4, a child node 430 assigned an SN of 5, and a child node 432 assigned an SN of 6. Snapshot 2 416-2 includes a root node 426 assigned an SN of 50 and a child node 434 assigned an SN of 100.

Figure 5:
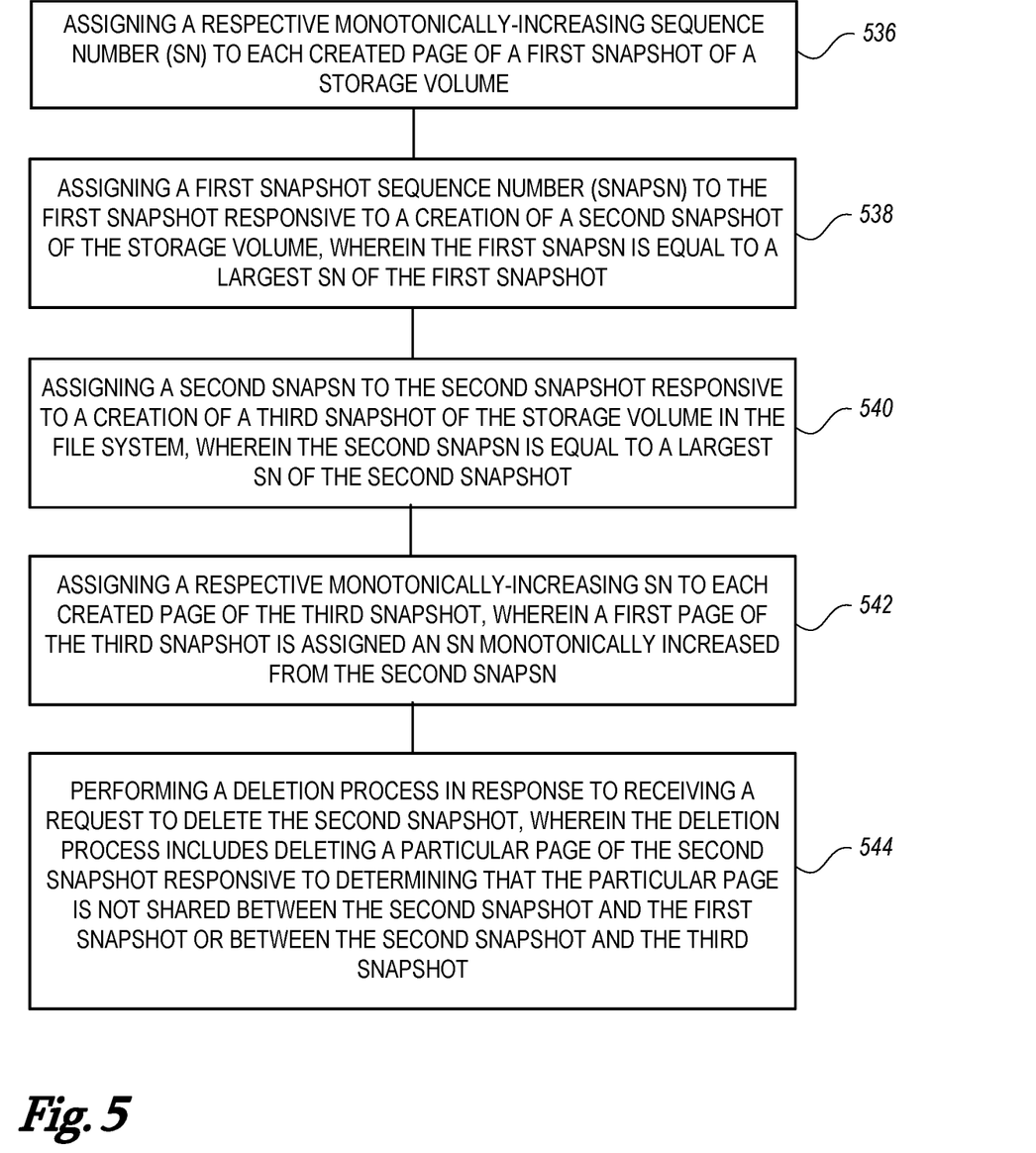
FIG. 5 is a flow chart illustrating one or more methods for deleting snapshot pages using sequence numbers and page lookups according to one or more embodiments of the present disclosure.

FIG. 5 is a flow chart illustrating one or more methods for deleting snapshot pages using sequence numbers and page lookups according to one or more embodiments of the present disclosure. FIG. 5 may discuss one or more embodiments of the present disclosure using the example illustrated in FIG. 4. It is noted however, that the present disclosure is not limited to the number or nature of the pages and/or snapshots discussed in the example.

The method can include, at 536 assigning a respective monotonically-increasing SN to each created page of a first snapshot of a storage volume. Referring back to FIG. 4, the pages of snapshot 1 have been assigned SNs of 1, 2, 3, 4, 5, and 6.

The method can include, at 538 assigning a first snapshot sequence number (snapSN) to the first snapshot responsive to a creation of a second snapshot of the storage volume, wherein the first snapSN is equal to a largest SN of the first snapshot. When the second snapshot 416-2 is created, snapshot 1 416-1 can be assigned a snapSN of 6, which is equal to the largest SN (6) of a node of snapshot 1 (the node 432).

The method can include, at 540 assigning a respective monotonically-increasing SN to each created page of the second snapshot, wherein a first page of the second snapshot is assigned an SN monotonically increased from the first snapSN. Referring back to FIG. 4, the pages of snapshot 2 have been assigned SNs of 50 and 100. It is noted again here that while 50 is not monotonically increased from 6, some nodes have been omitted from the example in FIG. 4 for purposes of clarity.

The method can include, at 542 assigning a second snapSN to the second snapshot responsive to a creation of a third snapshot of the storage volume in the file system, wherein the second snapSN is equal to a largest SN of the second snapshot. When a third snapshot (not shown in FIG. 4) is created, snapshot 2 416-2 can be assigned a snapSN of 100, which is equal to the largest SN (100) of a node of snapshot (the node 434). The method can include, at 544, assigning a respective monotonically-increasing SN to each created page of the third snapshot, wherein a first page of the third snapshot is assigned an SN monotonically increased from the second snap SN.

The method can include, at 546, performing a deletion process in response to receiving a request to delete the second snapshot, wherein the deletion process includes deleting a particular page of the second snapshot responsive to determining that the particular page is not shared between the second snapshot and the first snapshot or between the second snapshot and the third snapshot. In accordance with the present disclosure, embodiments herein can begin with the root node of the snapshot to be deleted. In some embodiments, if the SN of a node is equal to or smaller than the snapSN of its parent snapshot, the page associated with that node (including its whole subtree if it is an index node) is determined to be shared with the parent snapshot and the page should not be deleted. Stated differently, determining that a particular page of a second snapshot is not shared between a second snapshot and the first snapshot includes determining that the SN assigned to the particular page is larger than the first snapSN. In the example illustrated in FIG. 4, if snapshot 2 416-2 is to be deleted, comparing the SN of the node 434 (100) with the snapSN of snapshot 1 416-1 (6) shows that the node 434 is not shared between snapshot 1 416-1 and snapshot 2 416-2. A further inquiry, discussed below, would be carried out to determine if the node is shared with a child snapshot.

A further inquiry can be carried out to determine if node(s) of a snapshot to be deleted are shared with a child snapshot. Generally, determining that a particular page is not shared between a parent snapshot and a child snapshot can include determining a minimum logical key associated with the particular page and determining that the particular page is not traversed in a path of a B+Tree lookup of a logical extent associated with the minimum logical key in the child snapshot. Tree traversal is a form of graph traversal and refers to the process of visiting (e.g., retrieving, updating, or deleting) each node in a tree data structure once.

As will be appreciated by those of skill in the art, each B+tree page has its own physical address (e.g., on disk), which can be considered to be a unique identifier of that page. Each B+tree can have a minimum logical key (e.g., a logical key of a first extent of the page) regardless of whether the page is a leaf node page or an index node page. This minimum logical key may be a logical block address (LBA) and may simply be referred to herein as a "key."

Embodiments herein can take advantage of the key of a given page to look up the logical extent associated with the key in the child snapshot. If the page (owned by a snapshot to be deleted) is shared with the child snapshot, the page would be traversed in a path of the key lookup. Embodiments herein can use the unique identifier of a page to match it during the traversal for the key lookup. Accordingly, a lookup can be performed only for the top node of a shared subtree and pages exclusively owned by the child snapshot need not be iterated one-by-one.

This lookup can be further enhanced by leveraging the result of a previous lookup to speed up the next lookup because the previous lookup included the path of pages traversed and the index inside each page that points to its child pages. If the LBA of a lookup is similar to (e.g., has a similar path of) a previous lookup, fewer new pages can be loaded from the disk and the lookup speed can be increased. In some embodiments, if the logical block address (LBA) of a lookup is the same as (e.g., has a same path of) a previous lookup, no new pages need to be loaded from the disk and the lookup speed can be greatly increased.

Example pseudocode associated with these operations includes:

```
Delete Snapshot (node, parentSnapSN, childRootNode)
    pageAddr=node's unique PSA address
    key=node's first entry key
    if  node→SN<=parentSnapSN||PageLookup  (chil-
       dRootNode, key, pageAddr)
       // the page and its subtree are shared with parent
          snapshot or child snapshot
       return
    for childNode in node's children pages
       Delete Snapshot (childNode, parentSnapSN, chil-
          dRootNode)
    Delete (node)
PageLookup (rootNode, key, pageAddr)
    If rootNode==NULL
       return false
    node=rootNode
    while (node not NULL)
       if pageAddr==node's page address
          // the page is shared.
          return true
       node=node→child that contains the key
    // the page is not shared.
    return false
```

Referring back to the example illustrated in FIG. 4, if snapshot 1 416-1 is to be deleted, embodiments herein can begin with the root node 420, which is not shared. Assuming that none of the pages of snapshot 1 416-1 have been determined to be shared with a parent snapshot (not shown in FIG. 4), embodiments herein can determine if any nodes of snapshot 1 416-1 are shared with the child snapshot (snapshot 2 416-2).

Moving to the next node by increasing the SN (e.g., the SN 2 of node 422), embodiments herein can determine the key of the page associated with the node 422 and look up the logical extent associated with the key in the child snapshot 416-2. In this example, assume that the key of node 422 is 1 and the key of node 434 is also 1). The pages associated with the root node of the child snapshot 416-2 (e.g., node 426 with SN of 50) and the child node(s) of the child snapshot 416-2 (e.g., node 426 with SN of 100) can be loaded. In the lookup (key=1, childRoot) the page with SN 2 (node 422) is not traversed. Thus, embodiments herein can determine that the page 422 is not shared because if the page 422 was shared with the child snapshot 416-2, the page 422 would be traversed in a path of the key lookup.

Moving to the next node (e.g., the SN 3 of node 424), embodiments herein can determine the key of the page associated with the node 424 and look up the logical extent associated with the key in the child snapshot 416-2. In this example, assume that the key of node 424 is 2 and the key of node 434 is also 1). The page associated with the root node of the child snapshot 416-2 (e.g., node 426 with SN of 50) can be loaded. However, some embodiments include omitting, from the lookup, any pages of the child snapshot 416-2 having key smaller than the key of the page 424. Stated differently, the page associated with node 434 need not be loaded because this lookup is for a key of 2 and the node 434 has a key of 1. In the lookup (key=2, childRoot) the page with SN 3 (node 424) is traversed. Thus, embodiments herein can determine that the page 424 is shared with the child snapshot 416-2 and should not be deleted.

As previously discussed, the node 424 is an index node that has at least one pointer to a child node (three child nodes in this example: node 428, node 430, and node 432). In some embodiments, the method can include recursively traversing each child node of a page and determining, for each node, whether the node is shared with a parent snapshot and whether the node is shared with a child snapshot, as described herein. Stated differently, the method can include recursively traversing each child node of a particular page responsive to a determination that the particular page is an index node, and, for each child of the child node(s): determining that the child node is not shared by a parent snapshot based on a determination that the SN assigned to the child node is larger than the snapSN of the parent snapshot, and determining that the child node is not shared by a child snapshot based on a determination that the child node is not traversed in a path of a B+Tree lookup of a logical extent associated with the key of the child node in the child snapshot. If however, the index node 424 has already been determined to be shared (as in the example discussed above), some embodiments include omitting the recursive traversal of the child nodes altogether as these nodes can be determined to also be shared by virtue of their relationship to the index node.

Embodiments herein can use preorder traversal to iterate the snapshot to be deleted. Additionally, it will be appreciated by those of skill in the art that one of the properties of a CoW B+tree is that previously iterated pages necessarily have minimum keys equal to or less than those of the remaining pages. Accordingly, the total IO cost of page lookups at the child snapshot in accordance with embodiments of the present disclosure can be limited to only one full iterator in the most expensive case (e.g., no page needs to be loaded twice). Stated differently, some embodiments include performing a B+Tree lookup of the logical extent associated with the key in the child snapshot only once.

Figure 6:
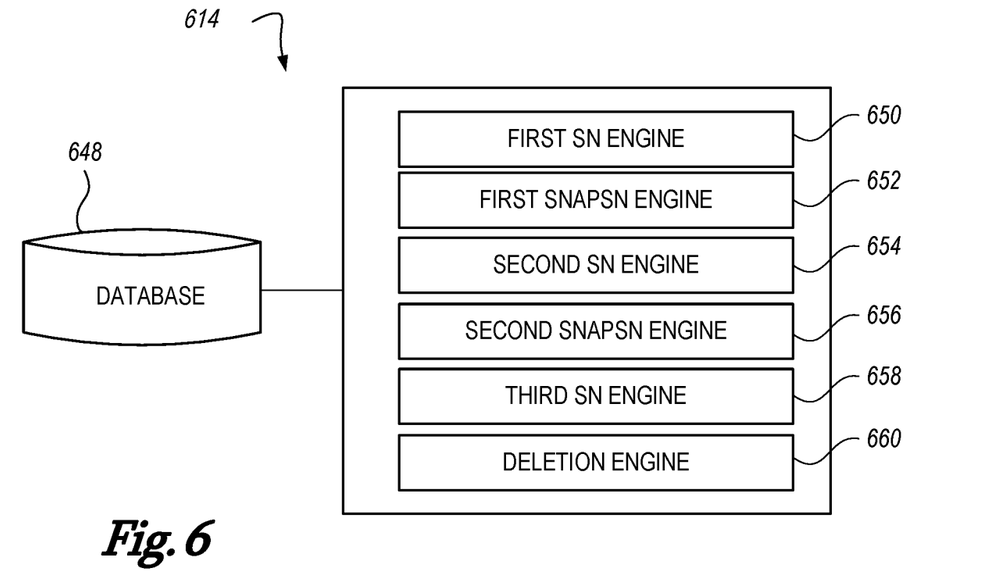
FIG. 6 is a diagram of a system for deleting snapshot pages using sequence numbers and page lookups according to one or more embodiments of the present disclosure.

FIG. 6 is a diagram of a system 614 for deleting snapshot pages using sequence numbers and page lookups according to one or more embodiments of the present disclosure. The system 614 can include a database 648 and/or a number of engines, for example first SN engine 650, first snapSN engine 652, second SN engine 654, second snapSN engine 656, third SN engine 658, and/or deletion engine 660 and can be in communication with the database 648 via a communication link. The system 614 can include additional or fewer engines than illustrated to perform the various functions described herein. The system 614 can represent program instructions and/or hardware of a machine (e.g., machine 762 as referenced in FIG. 7, etc.). As used herein, an "engine" can include program instructions and/or hardware, but at least includes hardware. Hardware is a physical component of a machine that enables it to perform a function. Examples of hardware can include a processing resource, a memory resource, a logic gate, an application specific integrated circuit, a field programmable gate array, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the first SN engine 650 can include a combination of hardware and program instructions that is configured to assign a respective monotonically-increasing SN to each created page of a first snapshot of a storage volume. In some embodiments, the first snapSN engine 652 can include a combination of hardware and program instructions that is configured to assign a first snapSN to the first snapshot responsive to a creation of a second snapshot of the storage volume, wherein the first snapSN is equal to a largest SN of the first snapshot. In some embodiments, the second SN engine 654 can include a combination of hardware and program instructions that is configured to assign a respective monotonically-increasing SN to each created page of the second snapshot, wherein a first page of the second snapshot is assigned an SN monotonically increased from the first snapSN. In some embodiments, the second snapSN engine 656 can include a combination of hardware and program instructions that is configured to assign a second snapSN to the second snapshot responsive to a creation of a third snapshot of the storage volume in the file system, wherein the second snapSN is equal to a largest SN of the second snapshot. In some embodiments, the third SN engine 658 can include a combination of hardware and program instructions that is configured to assign a respective monotonically-increasing SN to each created page of the third snapshot, wherein a first page of the third snapshot is assigned an SN monotonically increased from the second snapSN. In some embodiments, the deletion engine 660 can include a combination of hardware and program instructions that is configured to perform a deletion process in response to receiving a request to delete the second snapshot, wherein the deletion process includes deleting a particular page of the second snapshot responsive to determining that the particular page is not shared between the second snapshot and the first snapshot or between the second snapshot and the third snapshot.

Figure 7:
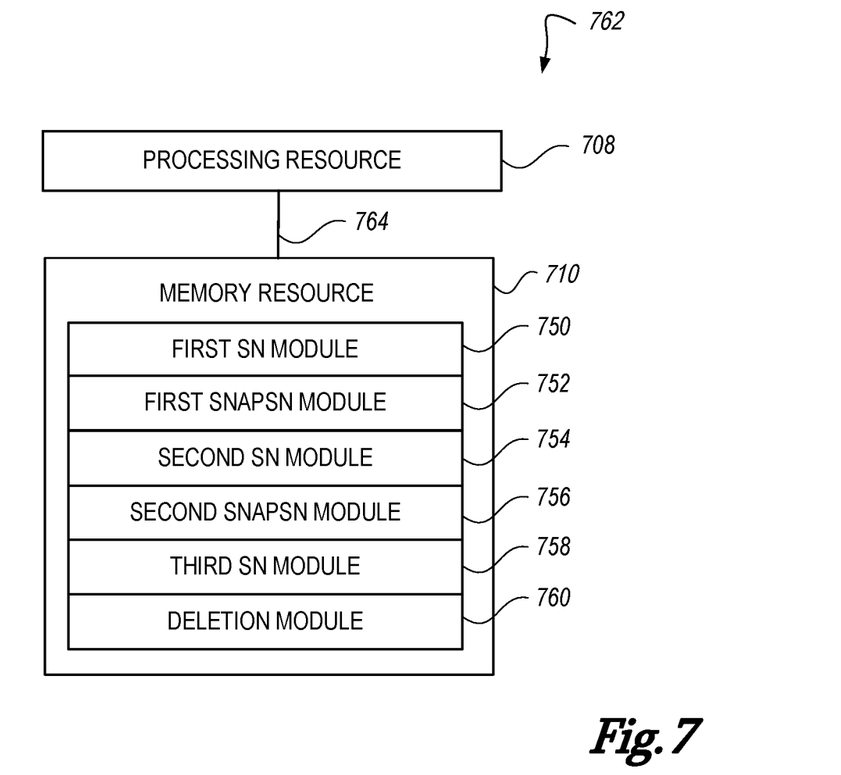
FIG. 7 is a diagram of a machine for deleting snapshot pages using sequence numbers and page lookups according to one or more embodiments of the present disclosure.

FIG. 7 is a diagram of a machine 762 for deleting snapshot pages using sequence numbers and page lookups according to one or more embodiments of the present disclosure. The machine 762 can utilize software, hardware, firmware, and/or logic to perform a number of functions. The machine 762 can be a combination of hardware and program instructions configured to perform a number of functions (e.g., actions). The hardware, for example, can include a number of processing resources 708 and a number of memory resources 710, such as a machine-readable medium (MRM) or other memory resources 710. The memory resources 710 can be internal and/or external to the machine 762 (e.g., the machine 762 can include internal memory resources and have access to external memory resources). In some embodiments, the machine 762 can be a VCI. The program instructions (e.g., machine-readable instructions (MRI)) can include instructions stored on the MRM to implement a particular function (e.g., an action such as assigning an SN). The set of MRI can be executable by one or more of the processing resources 708. The memory resources 710 can be coupled to the machine 762 in a wired and/or wireless manner. For example, the memory resources 710 can be an internal memory, a portable memory, a portable disk, and/or a memory associated with another resource, e.g., enabling MM to be transferred and/or executed across a network such as the Internet. As used herein, a "module" can include program instructions and/or hardware, but at least includes program instructions.

Memory resources 710 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change memory (PCM), 3D cross-point, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, magnetic memory, optical memory, non-volatile memory express (NVMe) drive, and/or a solid state drive (SSD), etc., as well as other types of machine-readable media.

The processing resources 708 can be coupled to the memory resources 710 via a communication path 764. The communication path 764 can be local or remote to the machine 762. Examples of a local communication path 764 can include an electronic bus internal to a machine, where the memory resources 710 are in communication with the processing resources 708 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 764 can be such that the memory resources 710 are remote from the processing resources 708, such as in a network connection between the memory resources 710 and the processing resources 708. That is, the communication path 764 can be a network connection. Examples of such a network connection can include a local area network (LAN), wide area network (WAN), personal area network (PAN), and the Internet, among others.

As shown in FIG. 7, the MRI stored in the memory resources 710 can be segmented into a number of modules 750, 752, 754, 756, 758, 760 that when executed by the processing resources 708 can perform a number of functions. As used herein a module includes a set of instructions included to perform a particular task or action. The number of modules 750, 752, 754, 756, 758, 760 can be sub-modules of other modules. For example, the second SN module 754 can be a sub-module of the first SN module 750 and/or can be contained within a single module. Furthermore, the number of modules 750, 752, 754, 756, 758, 760 can comprise individual modules separate and distinct from one another. Examples are not limited to the specific modules 750, 752, 754, 756, 758, 760 illustrated in FIG. 7.

Each of the number of modules 750, 752, 754, 756, 758, 760 can include program instructions and/or a combination of hardware and program instructions that, when executed by a processing resource 708, can function as a corresponding engine as described with respect to FIG. 6. For example, the deletion module 760 can include program instructions and/or a combination of hardware and program instructions that, when executed by a processing resource 708, can function as the deletion engine 660, though embodiments of the present disclosure are not so limited.

The machine 762 can include a first SN module 750, which can include instructions to assign a respective monotonically-increasing SN to each created page of a first snapshot of a storage volume. The machine 762 can include a first snapSN module 752, which can include instructions to assign a first snapSN to the first snapshot responsive to a creation of a second snapshot of the storage volume, wherein the first snapSN is equal to a largest SN of the first snapshot. The machine 762 can include a second SN module 754, which can include instructions to assign a respective monotonically-increasing SN to each created page of the second snapshot, wherein a first page of the second snapshot is assigned an SN monotonically increased from the first snapSN. The machine 762 can include a second snapSN module 756, which can include instructions to assign a second snapSN to the second snapshot responsive to a creation of a third snapshot of the storage volume in the file system, wherein the second snapSN is equal to a largest SN of the second snapshot. The machine 762 can include a third SN module 758, which can include instructions to assign a respective monotonically-increasing SN to each created page of the third snapshot, wherein a first page of the third snapshot is assigned an SN monotonically increased from the second snapSN. The machine 762 can include a deletion module 760, which can include instructions to perform a deletion process in response to receiving a request to delete the second snapshot, wherein the deletion process includes deleting a particular page of the second snapshot responsive to determining that the particular page is not shared between the second snapshot and the first snapshot or between the second snapshot and the third snapshot The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    assigning a respective monotonically-increasing sequence number (SN) to each created page of a first snapshot of a storage volume;
    assigning a first snapshot sequence number (snapSN) to the first snapshot responsive to a creation of a second snapshot of the storage volume, wherein the first snapSN is equal to a largest SN of the first snapshot;
    assigning a respective monotonically-increasing SN to each created page of the second snapshot, wherein a first page of the second snapshot is assigned an SN monotonically increased from the first snapSN;
    assigning a second snapSN to the second snapshot responsive to a creation of a third snapshot of the storage volume in the file system, wherein the second snapSN is equal to a largest SN of the second snapshot;
    assigning a respective monotonically-increasing SN to each created page of the third snapshot, wherein a first page of the third snapshot is assigned an SN monotonically increased from the second snapSN; and
    performing a deletion process in response to receiving a request to delete the second snapshot, wherein the deletion process includes deleting a particular page of the second snapshot responsive to determining that the particular page is not shared between the second snapshot and the first snapshot or between the second snapshot and the third snapshot.

2. The method of claim 1, wherein determining that the particular page is not shared between the second snapshot and the first snapshot includes determining that the SN assigned to the particular page is larger than the first snapSN.

3. The method of claim 1, wherein performing the deletion process includes determining that the particular page and any pages comprising an entire subtree of the particular page are shared between the second snapshot and the first snapshot based on a determination that the SN assigned to the particular page is equal to or smaller than the first snapSN, and wherein the method includes not deleting the particular page or the entire subtree of the particular page.

4. The method of claim 1, wherein determining that the particular page is not shared between the second snapshot and the third snapshot includes:
    determining a minimum logical key associated with the particular page; and
    determining that the particular page is not traversed in a path of a B+Tree lookup of a logical extent associated with the minimum logical key in the third snapshot.

5. The method of claim 4, wherein the method includes omitting, from the lookup, any pages of the third snapshot having an associated minimum logical key smaller than the minimum logical key associated with the particular page.

6. The method of claim 5, wherein the third snapshot includes a plurality of pages, and wherein the method includes performing the B+Tree lookup of the logical extent associated with the minimum logical key in the third snapshot only once.

7. The method of claim 1, wherein the method includes:
    recursively traversing each child node of the particular page responsive to a determination that the particular page is an index node; and
    for each child node of the particular page:
        determining that the child node is not shared between the second snapshot and the first snapshot based on a determination that the SN assigned to the child node is larger than the first snapSN;
        determining a minimum logical key associated with the child node; and
        determining that the child node is not shared between the second snapshot and the third snapshot based on a determination that the child node is not traversed in a path of a B+Tree lookup of a logical extent associated with the minimum logical key in the third snapshot.

8. A non-transitory machine-readable medium having instructions stored thereon which, when executed, cause the processor to:
    assign a respective monotonically-increasing sequence number (SN) to each created page of a first snapshot of a storage volume;
    assign a first snapshot sequence number (snapSN) to the first snapshot responsive to a creation of a second snapshot of the storage volume, wherein the first snapSN is equal to a largest SN of the first snapshot;
    assign a respective monotonically-increasing SN to each created page of the second snapshot, wherein a first page of the second snapshot is assigned an SN monotonically increased from the first snapSN;
    assign a second snapSN to the second snapshot responsive to a creation of a third snapshot of the storage volume in the file system, wherein the second snapSN is equal to a largest SN of the second snapshot;
    assign a respective monotonically-increasing SN to each created page of the third snapshot, wherein a first page of the third snapshot is assigned an SN monotonically increased from the second snapSN; and
    perform a deletion process in response to receiving a request to delete the second snapshot, wherein the deletion process includes deleting a particular page of the second snapshot responsive to determining that the particular page is not shared between the second snapshot and the first snapshot or between the second snapshot and the third snapshot.

9. The medium of claim 8, wherein the instructions to determine that the particular page is not shared between the second snapshot and the first snapshot include instructions to determine that the SN assigned to the particular page is larger than the first snapSN.

10. The medium of claim 8, wherein the instructions to perform the deletion process include instructions to determine that the particular page and any pages comprising an entire subtree of the particular page are shared between the second snapshot and the first snapshot based on a determination that the SN assigned to the particular page is equal to or smaller than the first snapSN, and wherein the instructions include instructions to not delete the particular page or the entire subtree of the particular page.

11. The medium of claim 8, wherein the instructions to determine that the particular page is not shared between the second snapshot and the third snapshot include instructions to:
  determine a minimum logical key associated with the particular page; and
  determine that the particular page is not traversed in a path of a B+Tree lookup of a logical extent associated with the minimum logical key in the third snapshot.

12. The medium of claim 11, including instructions to omit, from the lookup, any pages of the third snapshot having an associated minimum logical key smaller than the minimum logical key associated with the particular page.

13. The medium of claim 12, wherein the third snapshot includes a plurality of pages, and wherein the instructions include instructions to perform the B+Tree lookup of the logical extent associated with the minimum logical key in the third snapshot only once.

14. The medium of claim 8, wherein the method includes:
  recursively traversing each child node of the particular page responsive to a determination that the particular page is an index node; and
  for each child node of the particular page:
    determining that the child node is not shared between the second snapshot and the first snapshot based on a determination that the SN assigned to the child node is larger than the first snapSN;
    determining a minimum logical key associated with the child node; and
    determining that the child node is not shared between the second snapshot and the third snapshot based on a determination that the child node is not traversed in a path of a B+Tree lookup of a logical extent associated with the minimum logical key in the third snapshot.

15. A system, comprising:
  a first SN engine configured to assign a respective monotonically-increasing sequence number (SN) to each created page of a first snapshot of a storage volume;
  a first snapSN engine configured to assign a first snapshot sequence number (snapSN) to the first snapshot responsive to a creation of a second snapshot of the storage volume, wherein the first snapSN is equal to a largest SN of the first snapshot;
  a second SN engine configured to assign a respective monotonically-increasing SN to each created page of the second snapshot, wherein a first page of the second snapshot is assigned an SN monotonically increased from the first snapSN;
  a second snapSN engine configured to assign a second snapSN to the second snapshot responsive to a creation of a third snapshot of the storage volume in the file system, wherein the second snapSN is equal to a largest SN of the second snapshot;
  a third SN engine configured to assign a respective monotonically-increasing SN to each created page of the third snapshot, wherein a first page of the third snapshot is assigned an SN monotonically increased from the second snapSN; and
  a deletion engine configured to perform a deletion process in response to receiving a request to delete the second snapshot, wherein the deletion process includes deleting a particular page of the second snapshot responsive to determining that the particular page is not shared between the second snapshot and the first snapshot or between the second snapshot and the third snapshot.

16. The system of claim 15, wherein the deletion engine being configured to determine that the particular page is not shared between the second snapshot and the first snapshot includes the deletion being configured to determine that the SN assigned to the particular page is larger than the first snapSN.

17. The system of claim 15, wherein the deletion engine being configured to perform the deletion process includes the deletion engine being configured to determine that the particular page and any pages comprising an entire subtree of the particular page are shared between the second snapshot and the first snapshot based on a determination that the SN assigned to the particular page is equal to or smaller than the first snapSN, and wherein the deletion engine is configured to not delete the particular page or the entire subtree of the particular page.

18. The system of claim 15, wherein the deletion engine being configured to determine that the particular page is not shared between the second snapshot and the third snapshot includes the deletion engine being configured to:
  determine a minimum logical key associated with the particular page; and
  determine that the particular page is not traversed in a path of a B+Tree lookup of a logical extent associated with the minimum logical key in the third snapshot.

19. The system of claim 18, wherein the deletion engine is configured to omit, from the lookup, any pages of the third snapshot having an associated minimum logical key smaller than the minimum logical key associated with the particular page.

20. The system of claim 19, wherein the third snapshot includes a plurality of pages, and wherein the deletion engine is configured to perform the B+Tree lookup of the logical extent associated with the minimum logical key in the third snapshot only once.

* * * * *